(12) United States Patent
Lugt et al.

(10) Patent No.: US 8,566,588 B2
(45) Date of Patent: Oct. 22, 2013

(54) METHOD OF AUTHENTICATION AND SECURE EXCHANGE OF DATA BETWEEN A PERSONALISED CHIP AND A DEDICATED SERVER, AND ASSEMBLY FOR IMPLEMENTING THE SAME

(75) Inventors: Eric Lugt, Rances (CH); Jean-Claude Rais, Delémont (CH); Abdul-Hamid Kayal, Neuchâtel (CH)

(73) Assignee: EM Microelectric-Mann S.A., Marin (CH)

( * ) Notice: Subject to any disclaimer, the term of this patent is extended or adjusted under 35 U.S.C. 154(b) by 744 days.

(21) Appl. No.: 11/749,577

(22) Filed: May 16, 2007

(65) Prior Publication Data

US 2007/0279190 A1 Dec. 6, 2007

(30) Foreign Application Priority Data

May 16, 2006 (EP) ..................... 06114022

(51) Int. Cl.
*H04L 9/32* (2006.01)
(52) U.S. Cl.
USPC ........................................................ 713/168
(58) Field of Classification Search
USPC ........................................................ 713/168
See application file for complete search history.

(56) References Cited

U.S. PATENT DOCUMENTS

| | | | | |
|---|---|---|---|---|
| 5,657,390 | A * | 8/1997 | Elgamal et al. | 713/151 |
| 6,300,743 | B1 * | 10/2001 | Patino et al. | 320/106 |
| 6,466,671 | B1 * | 10/2002 | Maillard et al. | 380/227 |
| 7,065,503 | B2 * | 6/2006 | Matsushima et al. | 705/51 |
| 7,295,526 | B2 * | 11/2007 | Guanter et al. | 370/310 |
| 8,417,868 | B2 * | 4/2013 | Gupta et al. | 711/2 |
| 2002/0161722 | A1 | 10/2002 | Matsushima et al. | |
| 2003/0179778 | A1 * | 9/2003 | Guanter et al. | 370/503 |
| 2004/0025035 | A1 | 2/2004 | Jean-Claude et al. | |
| 2005/0044225 | A1 * | 2/2005 | Ota et al. | 709/225 |
| 2005/0108571 | A1 * | 5/2005 | Lu et al. | 713/201 |

FOREIGN PATENT DOCUMENTS

| | | |
|---|---|---|
| EP | 1 411 475 A1 | 4/2004 |
| EP | 1 596 342 A1 | 11/2005 |
| WO | 02/35464 A2 | 5/2002 |

OTHER PUBLICATIONS

European Search Report issued in corresponding application No. EP 06 11 4022, completed Nov. 27, 2006.

(Continued)

*Primary Examiner* — Kambiz Zand
*Assistant Examiner* — Dant Shaifer Harriman
(74) *Attorney, Agent, or Firm* — Griffin & Szipl, P.C.

(57) ABSTRACT

Authentication and secure wireless data exchange is provided between a chip with an identification code and a dedicated server via a read unit, which carries out contactless read and/or write operations on the chip. The read unit connects to a computer terminal connected to a communication network. A first connection is first established to the communication network from the computer terminal connected to the read unit to the dedicated server using a defined secure data communication protocol. A second connection to the communication network from the read unit to the dedicated server is then established using the computer terminal as a secure data transmission tunnel to directly exchange encrypted data between the read unit and the server invisibly to the computer terminal. Finally, wireless personalized communication is carried out between the read unit and the chip once the chip is identified upon request of the dedicated server.

20 Claims, 6 Drawing Sheets

(56) References Cited

OTHER PUBLICATIONS

Delphion Integrated View corresponding to EP 1 332 478, downloaded Jul. 22, 2010, which is filed herewith as "Exhibit A".
S4151 Device Specification, EM Document Center/11.03 pp. 1-36.
EM4095 Read/Write analog front end for 125kHz RFID Basestation, EM Microelectronic—Marin SA, www.emmicroelectronic.com, pp. 1-10.
EM4450 1KBit Read/Write Contactless Indentification Device, Communication from Transponder to the Transreceiver, EM Microelectronic—Marin SA, www.emmicroelectronic.com, pp. 11-16.
EM4450 1KBit Read/Write Contactless Indentification Device, EM Microelectronic—Marin SA, www.emmicroelectronic.com, pp. 1-10.
Exhibit B, which is a H. Arafat Ali, Qualitative Spatial Image Data Hiding for Secure Data Transmission, 7 GVIP Journal 35-43 (2007).
Berke Durak, "Hidden Data Transmission by Controlling Electromagnetic Emanations of Computers," at http://lambda-diode.com/electronics/tempest/, downloaded Nov. 30, 2011, dated Jan. 1, 1995, ten pages.
Computer Professional's Dictionary 130 (1990), which is Exhibit C2.
Webster's New World Dictionary of Computer Terms 95 (1983), which is Exhibit C3.
Jeremy Garcia, "Tunneling Data," at http://www.linaux-mag.com/id/2062/ (Jun. 15, 2005), which is Exhibit C4.
Charles Schluting, "Networking 101: Understanding Tunneling," at http:www.enterprisenetworkingplanet.com/netsp/article.php/36245 . . . (Aug. 3, 2006).
Eric Quinn, "Data Protection 101: Understanding Encryption & IPsec Tunnels," at http:tcpmag.com/features/article.asp?editorialsid=50 (Oct. 2002).

* cited by examiner

METHOD OF AUTHENTICATION AND SECURE EXCHANGE OF DATA BETWEEN A PERSONALISED CHIP AND A DEDICATED SERVER, AND ASSEMBLY FOR IMPLEMENTING THE SAME

This application claims priority from European Patent Application No. 06114022.4 filed May 16, 2006, the entire disclosure of which is incorporated herein by reference.

FIELD OF THE INVENTION

The invention concerns a method of authentication and secure exchange of data between a personalised chip and a dedicated server. The personalised chip with a stored identification code preferably forms part of a transponder in order to communicate wireless data to a dedicated server via a read unit connected to a computer terminal. The computer terminal is connected to a communication network between computer terminals for establishing communication with the server for example via the Internet.

The invention also concerns an assembly that includes a transponder with a personalised chip and an associated read unit for implementing the method. The read unit is arranged for carrying out contactless read and/or write operations on the chip when it is connected to a computer terminal.

BACKGROUND OF THE INVENTION

As it is currently used, a computer terminal, such as a computer station, can be connected to communication networks between computers locally or worldwide. Via the connection to the communication network, such as the Internet or Intranet network, it is possible to use or take advantage of several applications or services offered by one or more operators. In order to do this, a link from the computer terminal to at least one dedicated server has to be established.

A user authentication or identification may also be required for applications, which concern the management of rights of access through the communication network. Generally, the user has to introduce a password or access code using the computer terminal keyboard in order to be connected in a personalised manner to a required service. Insofar as several access codes have to be introduced using the keyboard for connection to various on line services, this requires the user to know all the access codes, which is inconvenient.

Some applications or services, which are obtained through the computer network, require greater security for the user of the computer terminal. These applications or services concern for example e-tickets, payment or e-purse, usual credit card payment, or assigning and managing physical access rights, such as electronic keys for hotel rooms, clubs or halls. In such case, after identifying the user, the data transferred between the server and the computer terminal is generally encrypted by a conventional encryption algorithm.

Protection of encrypted personal data, which is exchanged between the server and the computer terminal, is generally achieved by monitoring and protection software operating in the computer terminal. However, even with such monitoring software, the encrypted data exchanged is likely to remain visible in the terminal. This can allow a computer pirate to spy on the various data exchanges using a computer spy virus (Trojan horse), which means that the person data transferred is not totally secure.

The information drawn from encrypted data received from several applications by the computer terminal can also be transferred to a storage support, such as a chip with an identification code. In accordance with the present invention, as will be summarized below, a read unit is thus connected to the computer terminal in order to transmit wireless data signals for example to a transponder, which includes the chip. In order to do this, the transponder, in accordance with the present invention, must be located in a determined zone around the read unit in order to pick up the radiofrequency signals transmitted by the read unit. The read unit must first of all identify the transponder. Once the transponder of the present invention has been recognised, the data to be transmitted is encoded using a conventional encryption algorithm between the transponder and the associated read unit.

This transponder, according to the present invention, can be mounted in any type of portable object, such as a watch, an electronic badge, a card or a portable telephone. This enables a user, in accordance with the present invention, to transport the portable object fitted with the transponder easily in order to use the stored data relating to several applications in several service provider places. According to the present invention, personal access codes to various applications can be stored in the transponder chip and transmitted, during connection to the communication network, to the dedicated server from the terminal. However, as explained above with respect to conventional applications, the personal data is likely to be visible to a computer pirate during encrypted data transfer operations between the server and the computer terminal. Thus, even while ensuring a secure data transfer between the read unit connected to the computer terminal and the transponder in the portable object, the security of the user's personal data is not entirely guaranteed.

It is thus a main object of the present invention to provide a method for the authentication and secure wireless exchange of data between a personalised chip and a dedicated server in a transparent manner to the computer terminal connected to the communication network in order to overcome the aforementioned drawbacks of conventional applications and systems. Moreover, another object of the present invention it that an on-line connection to various personalised services can be achieved more simply.

SUMMARY OF THE INVENTION

The above stated objects of the invention are achieved by the present invention, which concerns a method of authentication and secure data exchange cited above, and which includes the features of a first embodiment pertaining to a method of wireless authentication and secure data exchange between an identification chip and a dedicated server via a read unit arranged for carrying out contactless read and/or write operations on the chip, wherein the read unit is connected to a computer terminal connected to a communication network of computer terminals, wherein the method includes steps consisting of: (a) establishing a first connection to the communication network from the computer terminal connected to a read unit towards the dedicated server by using a defined secured data communication protocol; (b) establishing a second connection to the communication network from the read unit to the dedicated server using the computer terminal as a secure data transmission tunnel in order to directly exchange encrypted data between the read unit and the server in a manner that is invisible to the computer terminal; and (c) establishing wireless personalised communication between the read unit and the identification code chip for an encrypted data transfer.

Particular steps of the method are defined in the additional method embodiments. For example, in accordance with a second method embodiment of the present invention, the first method embodiment is modified so that the identification code chip is identified by the read unit using an identification algorithm upon the request of the dedicated server once the first connection to the communication network has been established. In accordance with a third embodiment of the present invention, the first method embodiment is modified so that the identification code chip forms part of a transponder for communicating via radiofrequency signals with the read unit within a determined zone around the read unit, wherein in order to establish personalised communication between the read unit and the transponder, a mutual authentication algorithm is carried out in the read unit and in the transponder for mutual recognition. In accordance with a fourth embodiment of the present invention, the first method embodiment is modified so that during establishment of the first and second connections to the communication network, a standard SSL or TLS type data protection protocol is used. In accordance with a fifth embodiment of the present invention, the first embodiment is modified so that during establishment of the communication between the read unit and the computer terminal or the web server, a secure data transfer based on certificates, such as X.509 is used, the storage means of the chip includes at least partially the private key of the X.509 certificate. In accordance with a sixth embodiment of the present invention, the first method embodiment is modified so that the identification code chip forms part of a transponder, which is mounted in a portable object, such as a watch, fitted with manual means for introducing commands and a microprocessor connected to the manual introduction means and to the transponder, wherein the personalized communication between the read unit and the transponder is blocked following introduction of a specific user code using the manual introduction means.

In accordance with a seventh embodiment of the present invention, the first method embodiment, the second method embodiment, the third method embodiment, the fourth method embodiment, the fifth method embodiment, and the sixth method embodiment, are further modified so that the communication between the read unit and the transponder can be re-established or authorised following introduction of the same specific user code or following introduction of a complementary specific user code using the manual introduction means, which are formed of tactile keys arranged on one face of a glass of the portable object, such as a watch.

One advantage of the method lies in the fact that the read unit can initiate a second connection to the dedicated server through the connection network in a transparent manner for the computer terminal, which is typically used as a transmission tunnel for the encrypted data. Thus, the personal data exchanged between the server and the chip with an identification code via the read unit remain invisible in order to prevent any computer pirate from having access to such personal data in transit in the computer terminal.

Advantageously, the read unit includes a communication driver enabling the unit to be connected to the communication network to the dedicated server. An SSL or TLS type protocol is used for this second secure connection.

Advantageously, the encrypted data exchange between the read unit and the computer terminal or the web server uses X.509 certificates.

Advantageously, in addition to identification of the personalised chip by the read unit, a mutual authentication algorithm is implemented for greater security.

In accordance with the present invention, a read unit is thus connected to the computer terminal in order to transmit wireless data signals, for example, to a transponder, which includes the chip. In order to do this, the transponder must be located in a determined zone around the read unit in order to pick up the radiofrequency signals transmitted by the read unit. The read unit must first of all identify the transponder. Once the transponder has been recognised, the data to be transmitted is encoded using a conventional encryption algorithm between the transponder and the associated read unit.

This transponder can be mounted in any type of portable object, such as a watch, an electronic badge, a card or a portable telephone. This enables a user to transport the portable object fitted with the transponder easily in order to use the stored data relating to several applications in several service provider places. Personal access codes to various applications can be stored in the transponder chip and transmitted, during connection to the communication network, to the dedicated server from the terminal.

The invention, therefore, also concerns an eighth embodiment (i.e., a first assembly embodiment) for implementing the first method embodiment, wherein the assembly includes at least one personalised transponder having the identification code chip and the read unit capable of wireless communication in a personalised and secure manner with the corresponding transponder when the transponder is in a determined zone around the read unit.

Advantageous embodiments of the assembly are defined in additional embodiments of the assembly. For instance, in accordance with a ninth embodiment of the present invention, the first assembly embodiment is modified so that the read unit is configured in the form of a key fitted with a connector to be introduced into a corresponding entry port of the computer terminal, wherein the connector is of the RS485, RS232 or USB type, and in that the read unit includes an RF module fitted with an antenna for the remote interrogation of at least one specific transponder, an electric supply unit for receiving a supply voltage from a computer terminal, an input/output signal control interface to be connected by the connector to the computer terminal for the data transfer, a microprocessor, an oscillator for clocking operations processed via the microprocessor, and storage means including a protected part storing an identification or mutual authentication algorithm with the corresponding transponder switched on in the microprocessor. In accordance with a tenth embodiment of the present invention, the ninth embodiment is further modifies so that the storage means include in a protected part application identifiers relating to the corresponding transponder, an owner encoding algorithm for data exchanged with the transponder, an owner software of segmentation and memory segment management for programming the transponder chip storage means, a motor with a private key infrastructure, secure SSL or TLS communication protocol or software for communication via the communication network, and emulation software in accordance with the ISO 7816 protocol.

In accordance with an eleventh embodiment of the present invention, the first assembly embodiment is modified so that the transponder is mounted in a portable object, such as a watch, which includes manual control introduction means, which are formed of tactile keys of the capacitive type arranged on an inner face of a watch glass, activation of the tactile keys allowing the introduction of a specific user code for blocking or authorising communication with a read unit. In accordance with a twelfth embodiment of the present invention, the eleventh embodiment is further modified so that the tactile keys are 12 in number, each key arranged opposite a time indication of a watch dial, including ten tactile keys for forming the figures of a specific code and two keys for switching on or off the tactile keys, or validating a specific code introduced or selecting various menus to be displayed on a digital display device. In accordance with a thirteenth embodiment of the present invention, the eleventh embodiment is further modified so that the watch includes a microprocessor connected to the tactile keys and to the chip of the transponder to manage the communication with the chip with an identification code, the display of data on a digital display device of the watch and the introduction of at least one specific user code, and in that the transponder chip includes storage means segmented by programming carried out by the read unit for storing data relating to several applications in defined memory segments, and the storage means also includes a mutual authentication algorithm and an algorithm for managing at least one specific user code.

Advantageously, the transponder is mounted in a portable object, such as a watch. The watch can comprise several capacitive type tactile keys, which are arranged on an inner face of the watch glass. The keys can be connected to a microprocessor. Using these tactile keys, it is possible to introduce a specific user code to block or authorise communication with the read unit.

BRIEF DESCRIPTION OF THE DRAWINGS

The objects, advantages and features of the authentication and secure data exchange method, and of an assembly for implementing the method will appear more clearly in the following description in conjunction with the annexed drawings, in which.

DETAILED DESCRIPTION OF THE INVENTION

In the following description, in order to implement the authentication and secure data exchange method, the chip with a personal identification code preferably forms part of a transponder so as to be able to communicate with a read unit via radiofrequency signals. Mutual authentication can be carried out between the transponder and the read unit for the secure data exchange. Of course, a wireless data exchange with a read unit could have been envisaged using light or acoustic signals.

Figure 1:
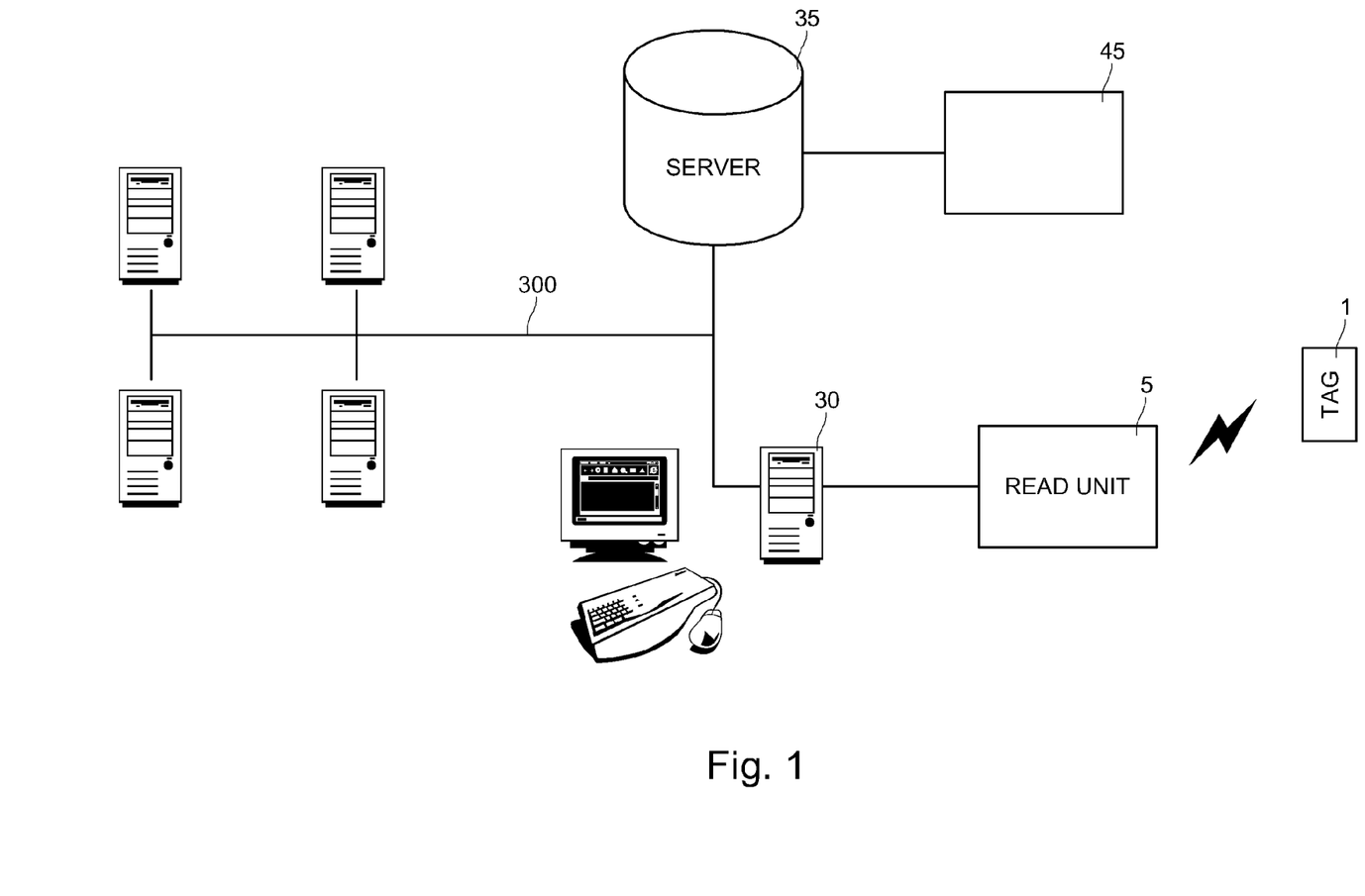
FIG. 1 shows a computer system for implementation in the communication network for implementing the authentication and secure data exchange method according to the invention.

FIG. 1 shows a computer system for network communication for implementing the authentication and secure data exchange method according to the present invention. According to this computer system, at least one read unit 5 is connected to a computer network (local or broad) 300 via a computer terminal 30, which may also include a keyboard, a screen and a mouse. At least one dedicated server 35 accessible from computer terminal 30 is also connected to network 300. This server 35 for example contains a central database to which a user carrying a personalised transponder 1 wishes to have access. The server itself may be fitted with or connected to a separate unit 45, whose functions may be similar to read unit 5. This second unit 45 can contain at least one application identifier in common with read unit 5 of transponder 1 as explained hereafter.

A personalised transponder 1 (TAG) can be interrogated by the read unit 5 specific to the transponder, when the transponder is in a determined zone around the read unit. This determined zone depends upon the dimension of an antenna of an RF module of read unit 5. The read unit could be arranged to detect such a transponder, when it is a few centimeters away from the read unit for example. Recognition of the transponder with a specific identification code must occur for the transmission of personal data between read unit 5 and the chip of transponder 1. In order to do this, for greater security, an identification or mutual authentication algorithm can be used between read unit 5 and transponder 1.

According to the computer system shown in FIG. 1, an authentication process can also be provided between read unit 5 of the transponder and the additional unit 45 connected to the server. In order to do this, the additional unit 45, which is connected to server 35, can be arranged to encrypt data transmitted to read unit 5 via computer terminal 30.

Figure 2:
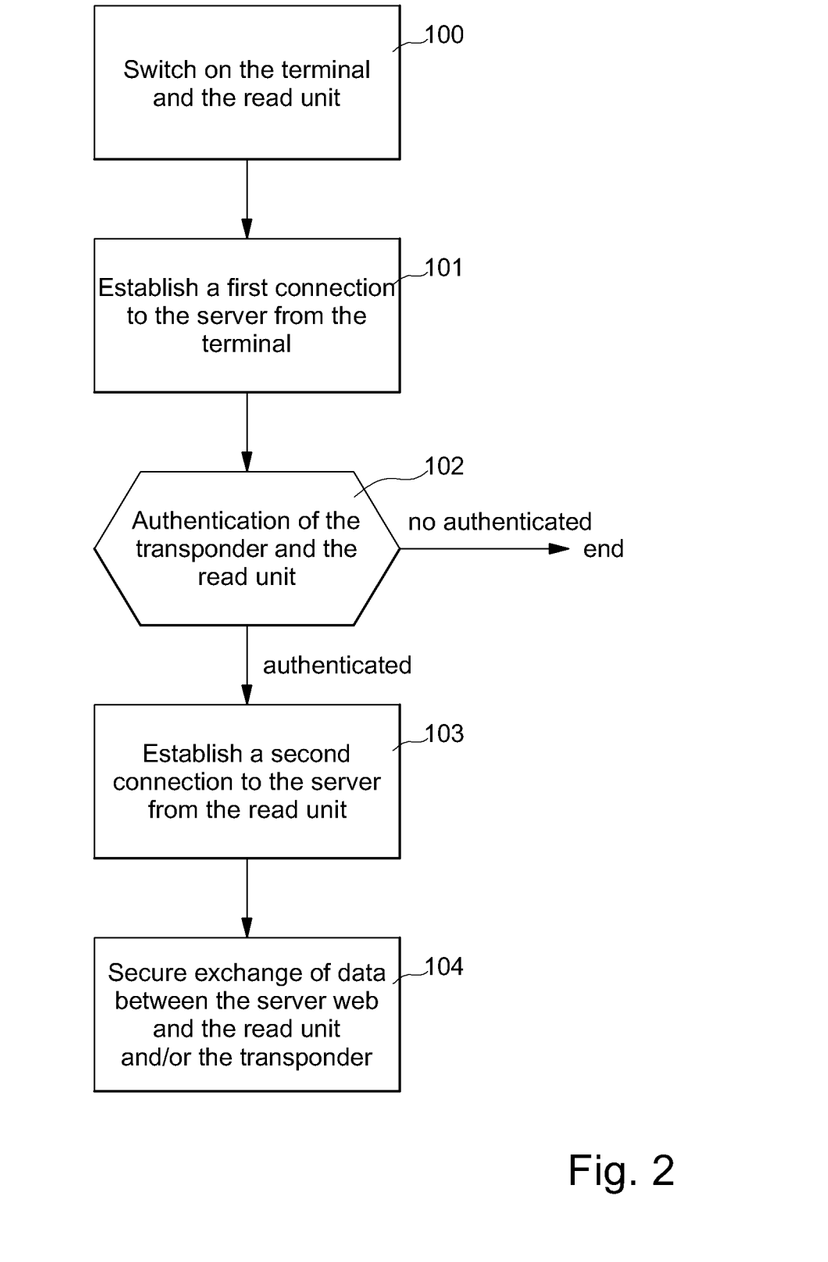
FIG. 2 shows a flow chart of the steps of the authentication and secure data exchange method according to the invention.

Reference is made hereafter to FIG. 2 in order to understand the various steps of the method of authentication and secure data exchange according to the invention. First of all, the computer terminal is switched on at step 100. At this step 100, the read unit can be switched on at the same time as the computer terminal if it is connected to an entry port of the terminal prior to being switched on. However, one could also envisage the computer terminal already being switched on before connecting the read unit to one of the entry ports of the computer terminal. As soon as it is connected to the computer terminal, the computer terminal identifies the read unit.

At step 101, a first connection is established with the communication network from the computer terminal connected to the read unit towards the dedicated server. This first connection can be carried out by the user using the computer terminal keyboard for example. In order to do this, a defined secured data communication protocol is used. This protocol may be a standard SSL (Secure Sockets Layer) or TLS (Transport Layer Security) type. The first connection can be started directly by the terminal connected to the read unit or upon the user's command using the keyboard of the terminal.

At step 102, identification and/or mutual authentication must be carried out between the read unit and the personalised transponder as soon as the transponder is in the determined zone around the read unit, and particularly upon the request of the dedicated server. The storage means of the read unit include the transponder identification data and a key for the encryption and decryption of data exchanged with the specific transponder. This identification and/or authentication process is well known to those skilled in the art and will consequently not be described here. If the read unit does not recognise the transponder, the communication ends. However, once the identification code of the transponder chip is recognised, and the transponder recognises the read unit, an encrypted data exchange can occur between the read unit and the transponder.

At step 103, a second connection is established with the communication network initiated by the read unit, which is connected to the terminal towards the dedicated server. The storage means of the read unit may comprise the server's address and various corresponding applications of the transponder chip. Moreover, the storage means comprise a connection software necessary for a microprocessor of the read unit to initiate the second connection via the communication network in order to be connected to the dedicated server. This second connection may be initiated directly after the first connection, but from the read unit.

During this second connection to the communication network, a secured data communication protocol, which is identical to the protocol of the first connection, can be started using the read unit software. In this second connection to the dedicated server initiated by the read unit, the computer terminal is used only as a data transmission tunnel. Consequently, a highly secure data exchange can be carried out between the server and the read unit without leaving any trace of the encrypted personal data in the computer terminal. However, during this second connection, the computer terminal is able to provide the state of the session and information as to the success of the transaction carried out, particularly between the read unit and the server. This second connection to the communication network prevents any pirating of encrypted personal data, which would have been visible if the encrypted data had been downloaded only into the computer terminal.

Different access codes or passwords of various personal applications stored in the transponder chip can be transmitted upon demand to the read unit that is communicating during this second connection. These access codes are transmitted by the read unit, which acts as a smart card emulator, to the dedicated server for a personal connection to all the corresponding applications or services. All of the access codes, which may correspond to application identifiers, can be stored in specific memory segments in accordance with programming carried out beforehand by the read unit. The terminal cannot have access to this part of the memory with the access codes of the read unit and the transponder.

Of course, once all of these identification and/or authentication steps, and first and second connections to the dedicated server have been carried out, several encrypted personal data exchanges are carried out at step 104 in an entirely secure manner without leaving any trace in the computer terminal. As indicated hereinabove, the secure data exchanges concern applications or services relating for example to e-ticketing, normal credit card payments, or assigning and managing physical rights of access, such as electronic keys for hotel rooms, clubs or halls.

It will thus be understood that by means of the computer system implementing a network shown in FIG. 1, secure access to data stored by the server 35 or the corresponding services can thus be entirely ensured. This secure access is obtained by establishing a first connection between the computer terminal 30 and the server 35, and by establishing a second connection between read unit 5 and server 35 using the computer terminal as a transmission tunnel. Once the second connection has been carried out, a secure encrypted data transfer can occur between the assembly formed by the read unit and the corresponding transponder.

The encrypted data exchange between the read unit and the computer terminal or the web server uses certificates, particularly X.509 (UIT standard X.509) certificates, for which the RFID type identification code chip at least contains the private part of the X.509 certificate. This method provides security with two independent components (the read unit and the transponder). The use of this certificate also offers additional security for known and public applications such as the e-sign, encryption of digital documents, switching on the network.

Figure 3A:
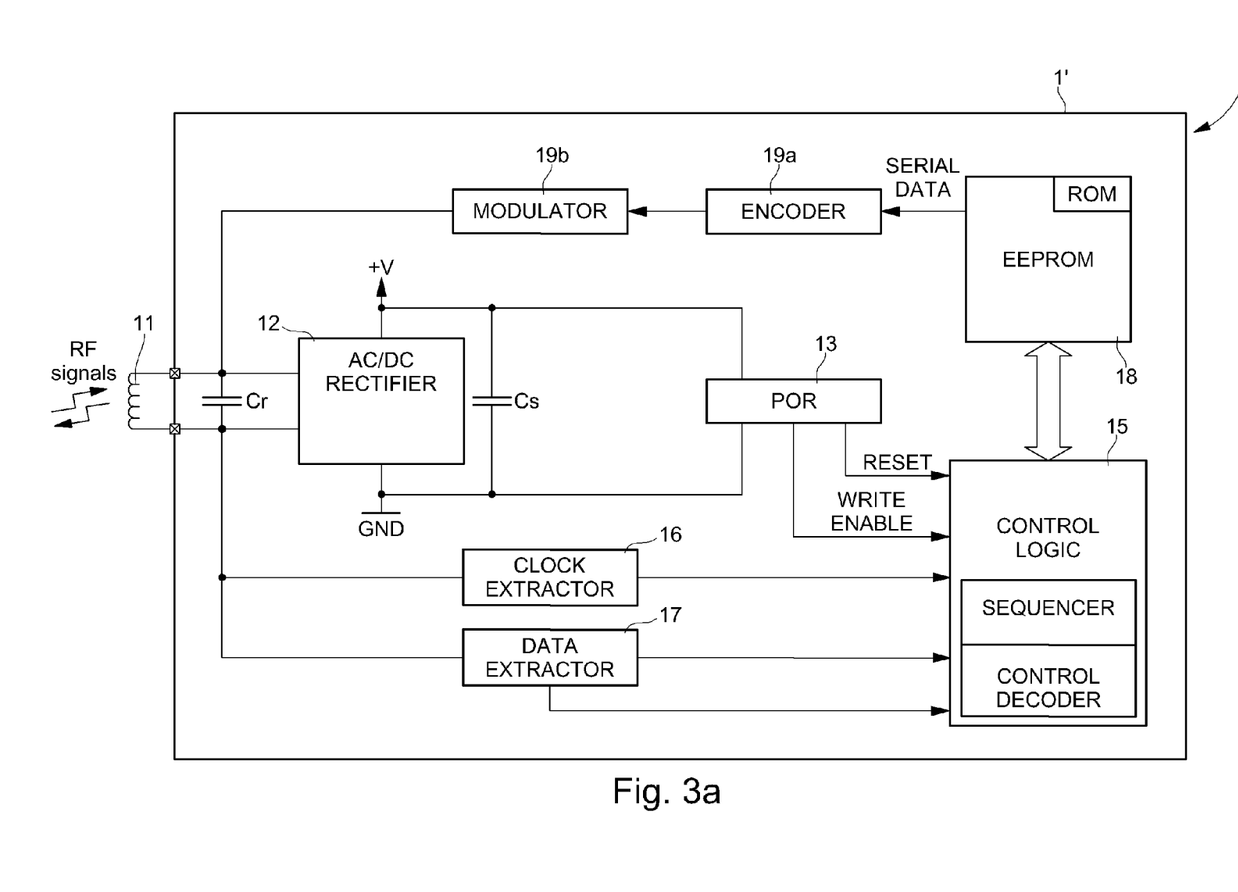
FIGS. 3a and 3b show the block diagrams of two types of transponders used within the scope of the present invention.
Figure 3B:
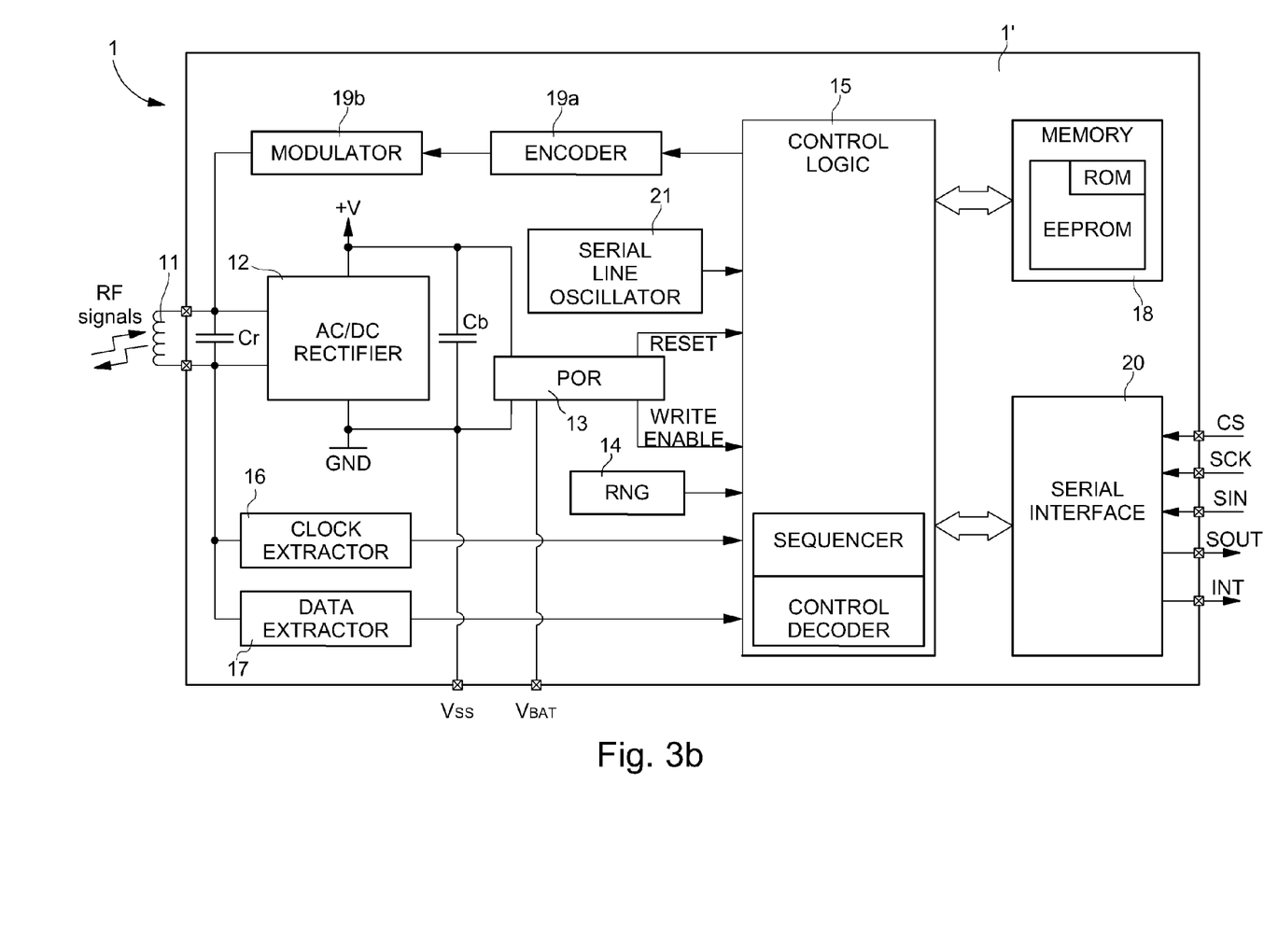

Any type of transponder on the market having individual identification and fitted, in high security cases, with a mutual authentication algorithm, can be used. FIGS. 3a and 3b show for example block diagrams of two types of transponder, the first with an identification algorithm and the second with an authentication algorithm, as information support for implementing the method according to the invention. Such transponders are for example marketed by EM Microelectronic-Marin SA under the reference EM 4450"1 Kbit READ/WRITE CONTACTLESS IDENTIFICATION DEVICE" for the first transponder of FIG. 3a and EM S4151 "2 Kbit READ/WRITE CONTACTLESS IDENTIFICATION DEVICE WITH SPI" for the second transponder of FIG. 3b. The transponder is for example of the passive type, but could also be powered by a battery at the terminals $V_{BAT}$ and $V_{SS}$ shown in FIG. 3b. Reference will be made as far as possible to the technical specifications of these circuits which are available publicly and which are, moreover, incorporated herein by reference.

As shown in FIGS. 3a and 3b, these transponders, which operate at a frequency of the order of 125 kHz, are arranged for cooperating with a read interface of the read unit. This interface is for example that marketed by EM Microelectronic-Marin SA under the reference EM 4095 "READ/WRITE ANALOG FRONT END FOR 125 kHz RFID BASESTATION" whose publicly available technical specification is also incorporated herein by reference. It will be noted that the use of the aforementioned components is not limiting and that other similar components could be used provided that they fulfil the desired functions. The transponder referenced EM 4002 by EM Microelectronic-Marin SA in Switzerland could also be used.

It should be noted that transponders and interfaces operating at HF frequencies of the order of 13.56 MHz or even higher frequencies (UHF and VHF) could be used.

The transponder TAG 1, which includes an identification code chip 1', is powered by the ambient electromagnetic field, which is mainly transmitted by the read unit. This electromagnetic field, such as RF signals, induces a voltage at the terminals of a coil 11 forming the antenna and connected to the chip. This voltage is rectified by an AC/DC rectifier unit 12 and supplies the supply voltage +V necessary for the transponder to operate. A voltage monitoring unit 13 regulates the voltage and ensure adequate initialisation of control logic 15 for chip 1'.

Transponder 1 further includes clock extraction means 16 for deriving a clock signal from the electromagnetic field, i.e. from the RF signals, for clocking control logic 15, data extraction means 17 for extracting modulated data in the RF signals, in combination with a control logic command decoder unit. Transponder 1 further includes storage means 18, formed in particular of a reprogrammable EEPROM memory and a read only memory ROM, and encoding means 19a and modulating means 19b for modulating and transmitting data stored for example in the storage means 18. These encoding means 19a are connected at the output of storage means 18 for the transponder of FIG. 3a, or at the output of the control logic 15 for the transponder of FIG. 3b.

The EEPROM memory of chip 1' of transponder 1 can be segmented using programming carried out by the read unit in order to reserve one or more memory segments for codes or data relating to a specific application. This EEPROM memory can be formed, in a non-limiting manner, of one part reserved for management and security. This part can include in particular control and protection data and the various security codes such as the password, the keys for mutual authentication, and the PIN and PUK codes. This part belongs to the chip and is subjected to specific access conditions.

The remaining EEPROM memory space is available for the user and forms a user memory space. It will be noted that complementary data relating to the transponder can also be stored in this memory space. This user memory space can be used for managing a plurality of distinct applications particularly during connection to the dedicated server. As indicated hereinabove, this memory space is preferably segmented into several memory segments, which contain application data belonging to various applications. At least one memory segment is assigned to each specific application.

The memory space could also store additional data and directory data that provide an indication of the applications stored in the transponder chip, and their memory position. The directory thus contains application identifiers, which are each specifically formed of a user number and a service number. For further information concerning the configuration of this type of transponder, reference can be made to the EP Application No. 1 332 478 and corresponding U.S. Patent Application Publication No. US 2004/0025035 A1, which are both incorporated herein by reference.

The read only memory ROM includes in a non-limiting manner the data relating to its identification, respectively, a serial number and an identification code number that are unique, i.e., peculiar to each transponder. This data is programmed by laser or OTP (one time programmed).

In the case of the EM S4151 transponder shown in FIG. 3b, control logic 15 contains the means for executing mutual (standard or owner) authentication with a read unit 5, data encryption, management of a user PIN code and a complementary user PUK code. The encryption keys and user codes are stored in the EEPROM memory. Chip 1' of transponder 1 also includes a random number generator RNG 14 necessary for authentication operations.

Chip 1' is capable of being directly connected by a serial interface 20 connected to control logic 15 by 5 connection terminals CS, SCK, SIN, SOUT, INT to a microprocessor or microcontroller. The microprocessor manages communication with the chip as explained partially hereafter with reference to FIG. 5. Signal CS relates to the selection of the chip for serial interface 20. Signal SCK is a clock signal for the serial interface. Signal SIN is a series data reception signal. Signal SOUT is a series data output signal for the microprocessor. Finally, signal SINT is an interruption request signal. If signal CS is inactive, a suitable serial line oscillator 21 generates clocking signals for control logic 15 in order to carry out serial line commands.

Figure 4:
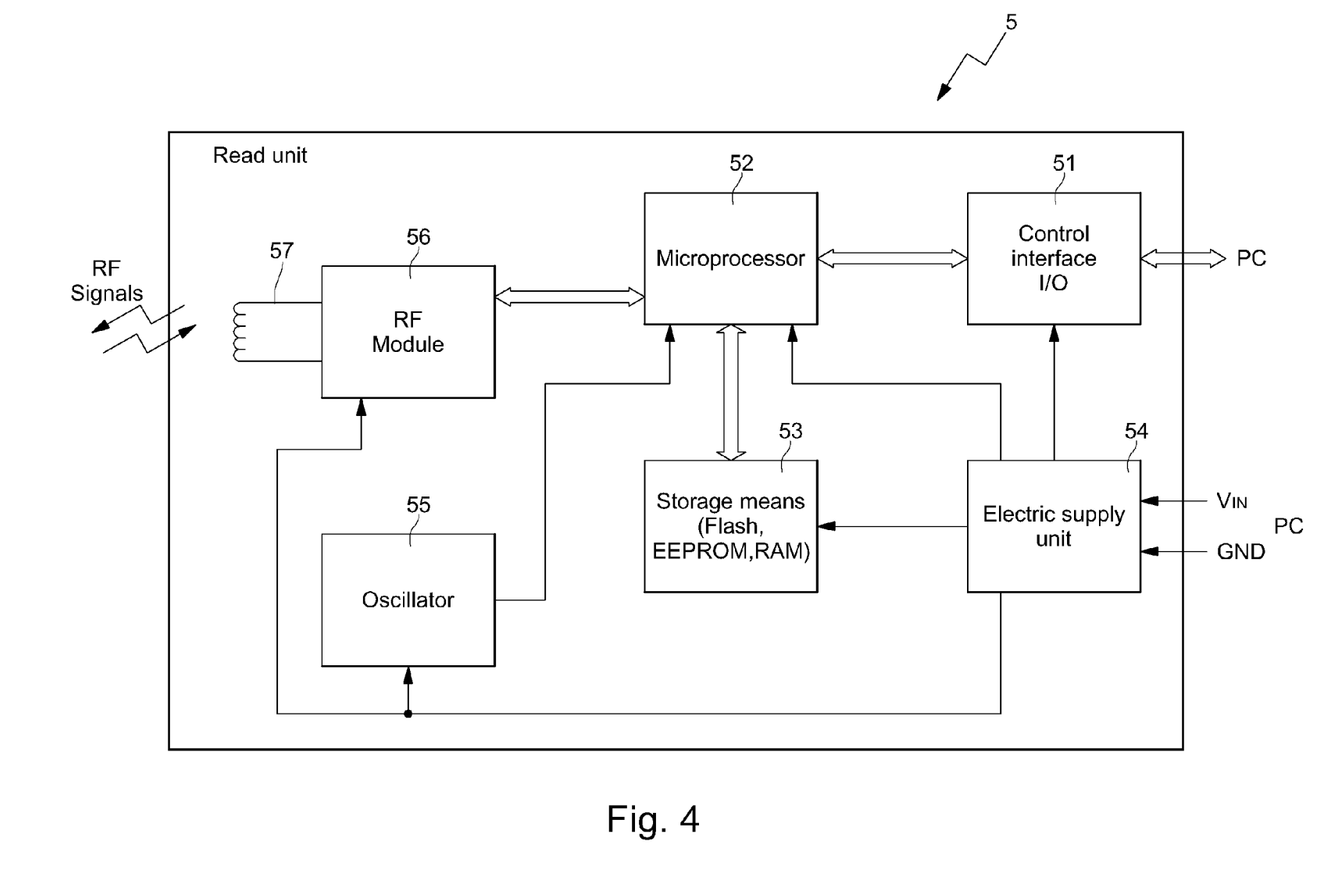
FIG. 4 shows a simplified block diagram of the elements making up the read unit for implementing the authentication and secure data exchange method according to the invention.

Referring now to FIG. 4, the general architecture of a read unit 5 for implementing the method according to the invention will now be described. A "read unit" means both a transponder read only unit and a unit for reading and programming a transponder.

Read unit 5 includes an RF module 56 fitted with an antenna 57 for the remote interrogation of at least one specific transponder, an electric supply unit 54 receiving a supply voltage $V_{IN}$, GND from the computer terminal. The read unit further includes an input/output signal control interface 51 connected by a connector of the RS232, RS485, USB or infrared type to the computer terminal for the transfer of data, a microprocessor 52, an oscillator 55 for clocking the operations processed by means of the microprocessor and storage means 53.

These storage means may comprise a set of FLASH, EEPROM and ROM type memories. The storage means comprise a protected part storing the identification means or mutual authentication means with the corresponding transponder to be operated in microprocessor 52, and the application identifier(s) of the applications for which the read unit is configured. The protected part of the storage means also comprises a cipher or encryption owner algorithm for the data exchanged with the transponder, an owner software of segmentation and transponder chip memory segment management, a private key infrastructure motor, a communication driver or software or SSL or TLS security protocol for communication through the communication network, and emulation software in accordance with standard ISO 7816. The storage means further comprise an application memory in which the memory fields are for storing data relating in particular to the transponder identification code and unencrypted application data relating to the transponder applications.

With its communication driver switched on by microprocessor 52, the read unit is able to be connected to a local or broad information network and to form a secure access interface for accessing data stored in a dedicated server. Moreover, a stored coding key can be used to switch on the mutual authentication algorithm and to encrypt function data for example the unique identification code of each transponder.

Figure 5:
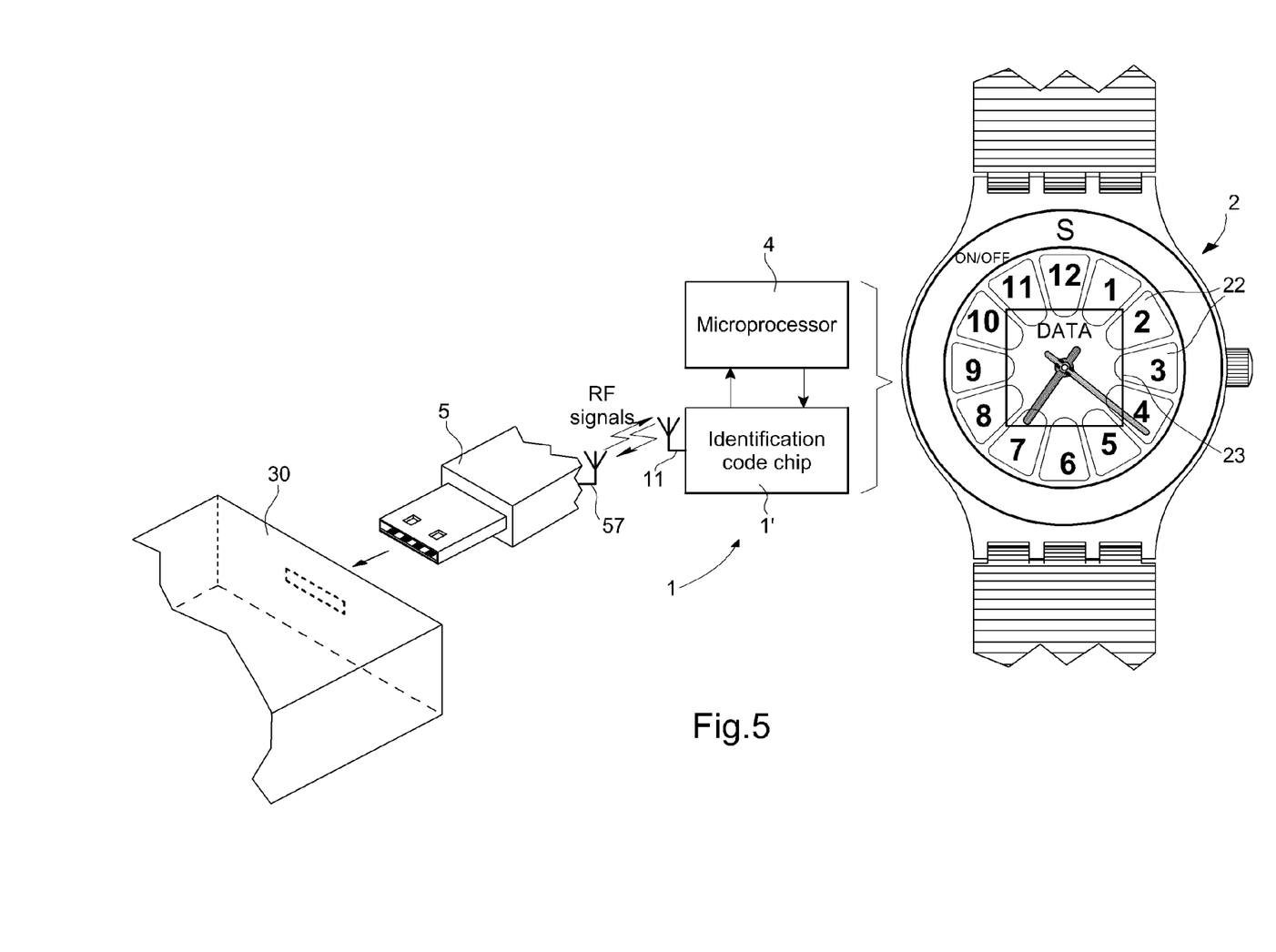
FIG. 5 shows an assembly formed of a read unit in the form of a USB key and a portable object fitted with a transponder according to the invention.

FIG. 5 shows a preferred embodiment of an assembly formed of a read unit 5 and a portable object, such as a wristwatch 2 fitted with a chip with an identification code 1'. The chip with an identification code 1' with an antenna 11 forms a transponder 1 capable of communicating RF data signals with the read unit in a determined zone around the read unit.

In this preferred embodiment, the read unit 5 takes the form of a USB type key so as to be able to be connected to an entry port of the USB key of a computer terminal. Antenna 57 of the RF module of read unit 5 transmits interrogation signals to detect at least one transponder in a determined zone around antenna 57. These interrogation signals are then transmitted after a dedicated server request, during connection to the server via the communication network, or at programmed time periods. Provided that watch 2 with its transponder is sufficiently close to the read unit, the identification algorithm or the mutual authentication algorithm is carried out so that the read unit recognises the specific transponder. From this moment and after the two steps of connection to the communication network towards the dedicated server, the read unit is able to transmit personal data for applications stored in the transponder to open the desired applications.

The wristwatch 2 may comprise in addition to transponder 1, a set of activation keys, which are preferably tactile keys 22 of the capacitive type arranged on an inner face of the watch glass, and a microprocessor 4 connected in particular to chip 1' of the transponder and to the tactile keys. In this embodiment, the tactile keys are 12 in number, each arranged above a time indication of the analogue watch dial. The tactile keys 22 referenced from 1 to 10, as 0, can be used to introduce a specific user numbered code (PIN code). The keys referenced 11 (on/off) and 12 (S) can be used for switching the tactile keys on or off, and for validating a code introduced using keys 1 to 10 or for selecting various menus concerning various applications for example.

Microprocessor 4 of the watch is capable of generating communication with the identification code chip 1' of transponder 1, display of data on a digital display device 23 of the analogue watch, introduction of at least one specific user code or various data by the tactile keys. The introduction of a specific user code (PIN or PUK code) using the switched on tactile keys could block or authorise secure wireless communication with the read unit or another read apparatus. The specific code introduced may relate to blocking or authorising the reading of access codes of such and such an application stored in the specific memory segments. Consequently, read unit 5 may be able to transfer encrypted data to the server or to the transponder for all the applications that are not blocked by the introduction of a specific user code. An application number in addition to the specific user code can be introduced via the tactile keys in order to block or authorise any communication otherwise possible between the chip and a read unit.

Display device 23 for example of the liquid crystal type can occupy one part of watch dial 2 or the entire dial in the case of a watch with digital time and data display. The display device is capable of providing personal indications for the specific user applications.

All of the personal data obtained from the various applications linked to the dedicated server are stored in an EEPROM memory of chip 1' of transponder 1 in the watch. Personal data may concern personal assets or values, such as tickets for a particular event, a subscription or electronic cash. Some of the data stored in the transponder memory can be returned upon demand during wireless transmission to a read apparatus in a shop or a machine, for example a vending machine. In order to authorise the data transfer in encrypted form, the introduction of a specific code by the user may be required, for example using tactile keys 22 of watch 2. A specific personal code may also be introduced into the machine with a read apparatus for greater data transfer security. This return of data may concern any application depending upon the position of each memory segment relating to a particular application.

From the description that has just been given, multiple variants of the method of authentication and secure data exchange and of the assembly for the implementation thereof can be devised by those skilled in the art without departing from the scope of the invention defined by the claims. The read unit connected to the computer terminal can automatically provide the addresses of the server and various services associated with the server. The transponder can be mounted in other portable objects, such as a smart card, an electronic badge or a telephone. A microprocessor for managing the transponder of portable object that is external to the object may be provided. In such case, an electric connection can also be provided through the case of the object for connecting the management microprocessor of an external unit and the transponder integrated in the portable object. Wireless transmission of management signals from the management microprocessor to the transponder can also be provided with means for introducing a specific code for blocking or authorising a transmission in the external unit including the microprocessor. The microprocessor can thus be outside the portable object. The tactile keys can also be arranged on the watchcase.

The invention claimed is:

1. A method of wireless authentication and secure data exchange between an identification chip and a dedicated server via a read unit arranged for carrying out contactless read or write, or read and write, operations on the chip, wherein the read unit is connected to a first computer terminal connected to a communication network of second computer terminals, wherein the method includes steps of:
    (a) establishing a first connection to the communication network from the first computer terminal connected to the read unit towards the dedicated server by using a defined secured data communication protocol;
    (b) establishing a second connection to the communication network from the read unit to the dedicated server using the first computer terminal as a secure data transmission tunnel in order to directly exchange encrypted data between the read unit and the server in a manner that is invisible to the first computer terminal;
    (c) establishing wireless personalised communication between the read unit and the identification code chip for an encrypted data transfer; and
    (d) directly exchanging encrypted data between the read unit and the server in a manner invisible to the first computer terminal by using the secure data transmission tunnel to exchange the encrypted data.

2. The method according to claim 1, wherein the identification code chip is identified by the read unit using an identification algorithm upon the request of the dedicated server once the first connection to the communication network has been established.

3. The method according to claim 1, wherein the identification code chip forms part of a transponder for communicating via radiofrequency signals with the read unit within a determined zone around the read unit, wherein in order to establish personalised communication between the read unit and the transponder, a mutual authentication algorithm is carried out in the read unit and in the transponder for mutual recognition.

4. The method according to claim 1, wherein during establishment of the first connection and the second connection to the communication network, a standard SSL or TLS type data protection protocol is used.

5. The method according to claim 1, wherein during establishment of the communication between the read unit and the first computer terminal or the dedicated server, a secure data transfer based on certificates, including an X.509 certificate, is used, and the storage means of the chip includes at least partially the private key of the X.509 certificate.

6. The method according to claim 1, wherein the identification code chip forms part of a transponder that is mounted in a portable object fitted with manual introduction means for introducing commands and a microprocessor connected to the manual introduction means and to the transponder, wherein personalised communication between the read unit and the transponder is blocked following introduction of a specific user code using the manual introduction means.

7. The method according to claim 6, wherein the communication between the read unit and the transponder is re-established or authorised following introduction of the same specific user code, or following introduction of a complementary specific user code, using manual introduction means, wherein the manual introduction means are formed of tactile keys arranged on one face of a glass of the portable object.

8. An assembly for implementing a method of wireless authentication and secure data exchange between an identification code chip and a dedicated server via a read unit arranged for carrying out contactless read or write, or read and write, operations on the chip, wherein the read unit is connected to a first computer terminal connected to a communication network of second computer terminals, wherein the assembly includes:
    (a) at least one personalised transponder having the identification code chip; and
    (b) the read unit capable of wireless communication in a personalised and secure manner with the corresponding at least one personalised transponder when the personalised transponder is in a determined zone around the read unit,
    wherein the method of wireless authentication and secure data exchange performed by the assembly includes the steps of:
        i. establishing a first connection to the communication network from the first computer terminal connected to the read unit towards the dedicated server by using a defined secured data communication protocol;
        ii. establishing a second connection to the communication network from the read unit to the dedicated server using the first computer terminal as a secure data transmission tunnel in order to directly exchange encrypted data between the read unit and the server in a manner that is invisible to the first computer terminal;

iii. establishing wireless personalised communication between the read unit and the identification code chip for an encrypted data transfer; and iv. directly exchanging encrypted data between the read unit and the server in a manner invisible to the first computer terminal by using the secure data transmission tunnel to exchange the encrypted data.

9. The assembly according to claim 8, wherein the read unit is configured in the form of a key fitted with a connector to be introduced into a corresponding entry port of the first computer terminal, wherein the connector is of the RS485, RS232 or USB type, and the read unit also includes i. an RF module fitted with an antenna for remote interrogation of at least one specific transponder;

ii. an electric supply unit for receiving a supply voltage from the first computer terminal;

iii. an input/output signal control interface to be connected by the connector to the first computer terminal for the data transfer;

iv. a microprocessor;

v. an oscillator for clocking operations processed via the microprocessor; and vi. storage means including a protected part storing an identification or mutual authentication algorithm with the corresponding at least one personalised transponder switched on in the microprocessor.

10. The assembly according to claim 9, wherein the storage means include, in a protected part, application identifiers relating to the corresponding at least one personalised transponder, an owner encoding algorithm for data exchanged with the personalised transponder, an owner software of segmentation and memory segment management for programming the transponder chip storage means, a motor with a private key infrastructure, secure SSL or TLS communication protocol or software for communication via the communication network, and emulation software in accordance with the ISO 7816 protocol.

11. The assembly according to claim 8, wherein the first transponder is mounted in a portable object that includes manual control introduction means, wherein the portable object is a watch, and the manual control introduction means are formed of tactile keys of a capacitive type arranged on an inner face of a watch glass of the watch, wherein activation of the tactile keys allows introduction of a specific user code for blocking or authorising communication with the read unit.

12. The assembly according to claim 11, wherein the tactile keys are twelve in number, wherein each key is arranged opposite a time indication of a watch dial of the watch, wherein ten tactile keys are for forming figures of a specific code and two keys are for switching on or off the tactile keys, or are for validating a specific code introduced, or are for selecting various menus to be displayed on a digital display device of the watch.

13. The assembly according to claim 11, wherein the watch further includes a microprocessor connected to the tactile keys and to the chip of the at least one personalised transponder to manage the communication with the chip with an identification code, and to manage display of data on a digital display device of the watch, and to manage the introduction of at least one specific user code, and wherein the chip of the personalised transponder includes storage means segmented by programming carried out by the read unit for storing data relating to several applications in defined memory segments, wherein the storage means also includes a mutual authentication algorithm and an algorithm for managing at least one specific user code.

14. The method according to claim 6, wherein the communication between the read unit and the transponder is re-established or authorised following introduction of the same specific user code, or following introduction of a complementary specific user code, using the manual introduction means, wherein the manual introduction means are formed of tactile keys arranged on one face of a glass of the portable object.

15. The method according to claim 5, wherein the dedicated server is a web server.

16. The method according to claim 6, wherein the portable object is a watch.

17. The method according to claim 7, wherein the portable object is a watch.

18. The method according to claim 14, wherein the portable object is a watch.

19. A method of wireless authentication and secure data exchange between an identification chip and a dedicated server via a read unit arranged for carrying out contactless read or write, or read and write, operations on the chip, wherein the read unit is connected to a first computer terminal connected to a communication network of second computer terminals, wherein the method includes steps of:

(a) establishing a first connection to the communication network from the first computer terminal connected to the read unit towards the dedicated server by using a defined secured data communication protocol;

(b) establishing a second connection to the communication network from the read unit to the dedicated server using the first computer terminal as a secure data transmission tunnel in order to directly exchange encrypted data between the read unit and the server in a manner that is invisible to the first computer terminal;

(c) establishing wireless personalised communication between the read unit and the identification code chip for an encrypted data transfer, wherein the wireless personalised communication between the read unit and the identification code chip uses light signals or acoustic signals, and wherein the identification code chip is identified by the read unit using an identification algorithm upon the request of the dedicated server once the first connection to the communication network has been established; and (d) directly exchanging encrypted data between the read unit and the server in a manner invisible to the first computer terminal by using the secure data transmission tunnel to exchange the encrypted data.

20. An assembly for implementing a method of wireless authentication and secure data exchange between an identification code chip and a dedicated server via a read unit arranged for carrying out contactless read or write, or read and write, operations on the chip, wherein the read unit is connected to a first computer terminal connected to a communication network of second computer terminals, wherein the assembly includes:

(a) at least one personalised transponder having the identification code chip; and (b) the read unit capable of wireless communication in a personalised and secure manner with the corresponding at least one personalised transponder when the personalised transponder is in a determined zone around the read unit, wherein the method of wireless authentication and secure data exchange performed by the assembly includes the steps of:

i. establishing a first connection to the communication network from the first computer terminal connected to the read unit towards the dedicated server by using a defined secured data communication protocol;

ii. establishing a second connection to the communication network from the read unit to the dedicated server using the first computer terminal as a secure data transmission tunnel in order to directly exchange encrypted data between the read unit and the server in a manner that is invisible to the first computer terminal;

iii. establishing wireless personalised communication between the read unit and the identification code chip for an encrypted data transfer; and iv. directly exchanging encrypted data between the read unit and the server in a manner invisible to the first computer terminal by using the secure data transmission tunnel to exchange the encrypted data, wherein the first transponder is mounted in a portable object that includes manual control introduction means, wherein the portable object is a watch, and the manual control introduction means are formed of tactile keys of a capacitive type arranged on an inner face of a watch glass of the watch, wherein activation of the tactile keys allows introduction of a specific user code for blocking or authorising communication with the read unit, and wherein the wireless personalised communication between the read unit and the identification code chip uses light signals or acoustic signals.

* * * * *

UNITED STATES PATENT AND TRADEMARK OFFICE
CERTIFICATE OF CORRECTION

| | | |
|---|---|---|
| PATENT NO. | : 8,566,588 B2 | Page 1 of 1 |
| APPLICATION NO. | : 11/749577 | |
| DATED | : October 22, 2013 | |
| INVENTOR(S) | : Eric Lugt et al. | |

It is certified that error appears in the above-identified patent and that said Letters Patent is hereby corrected as shown below:

Title Page, Item (73) Assignee should read

-- (73)   Assignee:   EM Microelectronic-Marin S.A., Marin (CH) --

Signed and Sealed this
Sixth Day of May, 2014

Michelle K. Lee
*Deputy Director of the United States Patent and Trademark Office*